(12) United States Patent  (10) Patent No.: US 9,004,780 B2
Yee et al.  (45) Date of Patent: Apr. 14, 2015

(54) HYBRID DEVICE IDENTIFIER

(71) Applicant: IRIDEX Corporation, Mountain View, CA (US)

(72) Inventors: Kingman Yee, San Jose, CA (US); Ronald Avisa, Newark, CA (US)

(73) Assignee: IRIDEX Corporation, Mountain View, CA (US)

( * ) Notice: Subject to any disclaimer, the term of this patent is extended or adjusted under 35 U.S.C. 154(b) by 11 days.

(21) Appl. No.: 14/034,983

(22) Filed: Sep. 24, 2013

(65) Prior Publication Data

US 2014/0086535 A1  Mar. 27, 2014

Related U.S. Application Data

(60) Provisional application No. 61/704,799, filed on Sep. 24, 2012.

(51) Int. Cl.
*G02B 6/00* (2006.01)
*G02B 6/42* (2006.01)

(52) U.S. Cl.
CPC .................................. *G02B 6/4293* (2013.01)

(58) Field of Classification Search
USPC ............................ 385/80, 88–90, 92, 93, 147
See application file for complete search history.

(56) References Cited

U.S. PATENT DOCUMENTS

| | | | |
|---|---|---|---|
| 5,085,492 A | 2/1992 | Kelsoe et al. | |
| 8,363,783 B2 | 1/2013 | Gertner et al. | |
| 8,366,704 B2 | 2/2013 | Lin et al. | |
| 8,409,180 B2 | 4/2013 | Blumenkranz et al. | |
| 2001/0046132 A1 | 11/2001 | Lanzetta et al. | |
| 2002/0051116 A1 | 5/2002 | Van Saarloos et al. | |
| 2004/0170304 A1 | 9/2004 | Haven et al. | |
| 2006/0083466 A1 | 4/2006 | Boutoussov | |
| 2007/0181424 A1 | 8/2007 | Frey et al. | |
| 2007/0185475 A1 | 8/2007 | Frey et al. | |
| 2010/0004641 A1 | 1/2010 | Frey et al. | |

(Continued)

FOREIGN PATENT DOCUMENTS

| | | |
|---|---|---|
| JP | 4349705 | 7/2009 |
| JP | 4377405 | 9/2009 |

(Continued)

OTHER PUBLICATIONS

International Search Report and Written Opinion of PCT/US2012/060979, mailed Mar. 1, 2013, 16 pages.

*Primary Examiner* — Akm Enayet Ullah
(74) *Attorney, Agent, or Firm* — Kilpatrick Townsend & Stockton LLP (57) ABSTRACT

An identification assembly for use with a fiber-optic connector includes a non-conducting over-nut, an electrical assembly disposed at the proximal end of the over-nut, and an RFID tag supported by the distal end of the over-nut. The over-nut is configured to surround and couple with the fiber-optic connector. The electrical assembly includes a first electrical contact configured to electrically connect to the fiber-optic connector, a second electrical contact configured for electrical engagement with a contact portion of a light source assembly, and one or more electrical components coupled between the first and second contacts and providing a defined electrical characteristic. The identification assembly enables identification using either electrical-characteristic based or RFID-based identification approaches.

20 Claims, 9 Drawing Sheets

(56) References Cited

U.S. PATENT DOCUMENTS

| | | |
|---|---|---|
| 2010/0004643 A1 | 1/2010 | Frey et al. |
| 2012/0156923 A1* | 6/2012 | Gao .............................. 439/488 |
| 2012/0244743 A1* | 9/2012 | Lukas ........................... 439/488 |
| 2013/0078848 A1* | 3/2013 | Kummetz ...................... 439/488 |
| 2013/0110092 A1 | 5/2013 | Yee |
| 2013/0110093 A1 | 5/2013 | Yee |
| 2013/0110206 A1 | 5/2013 | Yee et al. |
| 2013/0116672 A1 | 5/2013 | Yee |
| 2013/0201006 A1* | 8/2013 | Kummetz et al. ............ 340/10.1 |
| 2013/0210270 A1* | 8/2013 | Takeuchi et al. .............. 439/488 |

FOREIGN PATENT DOCUMENTS

| | | |
|---|---|---|
| JP | 2011-156290 | 8/2011 |
| JP | 2011-212349 | 10/2011 |
| JP | 2011-212352 | 10/2011 |
| JP | 2011-224345 | 11/2011 |
| JP | 2011-234742 | 11/2011 |
| JP | 5066094 | 8/2012 |
| JP | 5091149 | 9/2012 |

* cited by examiner

HYBRID DEVICE IDENTIFIER

CROSS-REFERENCE TO RELATED APPLICATIONS

This application claims priority to Provisional U.S. Patent Application Ser. No. 61/704,799 filed Sep. 24, 2012, entitled "Hybrid Device Identifier," the entire disclosure of which is hereby incorporated by reference, for all purposes, as if fully set forth herein.

BACKGROUND

Various medical devices deliver energy (e.g., radiation such as light, radio frequency, etc.) through a delivery conduit. For example, medical areas that use lasers include angioplasty, cancer diagnosis and treatment, cosmetic applications such as laser hair removal and tattoo removal, dermatology, lithotripsy, mammography, medical imaging, microscopy, ophthalmology (includes Lasik and laser photocoagulation), optical coherence tomography, prostatectomy, and surgery. Consoles used to generate the energy typically need to know what type of delivery conduit is attached for a variety of reasons (e.g., power attenuation, filtering, etc.).

With many older laser device consoles, the identification of the attached delivery conduit (e.g., fiber optic cable) has been accomplished via a fixed resistance mechanism attached to the delivery conduit. Each type of delivery conduit is associated with a particular resistance. The delivery conduit is identified by measuring the resistance and identifying the attached delivery conduit based on the measured resistance.

With many newer laser device consoles, the identification of the attached conduit has been accomplished via a radio frequency identification (RFID) tag attached to the delivery conduit. A receiver in the laser device console receives identification information from the RFID tag.

A problem arises where both types of laser consoles (those using fixed resistance based identification and those using RFID-based identification) are in use. For example, doctors that have both types of consoles may need to have both resistive and RFID delivery conduits on hand. For manufacturers and suppliers of delivery conduits, they may need to make and stock both resistive and RFID delivery conduits.

Accordingly, there is a need for improved delivery conduits, particularly for delivery conduits that can be identified by medical device consoles that employ resistive-based delivery conduit identification and by medical device consoles that employ RFID-based delivery conduit identification.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Energy delivery conduit connectors and related components are provided that can be used with medical device consoles that employ either resistive-based delivery conduit identification or RFID-based delivery conduit identification. The conduit connectors incorporate both a fixed resistance mechanism and an RFID tag. The fixed resistance mechanism is disposed at one end of a non-conducting over-nut and the RFID tag is disposed at the other end of the over-nut. The non-conducting over-nut separates the RFID tag from the fixed resistance mechanism, thereby preventing the fixed resistance mechanism from interfering with operation of the RFID tag. The over-nut is configured to not interfere with the operation of the RFID tag. Accordingly, duplication of delivery conduits related to identification of the delivery conduits can be avoided.

Thus, in one aspect, a fiber optic connector is provided for use with a radiation source assembly having a complementary connector. The fiber optic connector includes an inner connector, a non-conducting over-nut, an electrical assembly, and an RFID tag. The inner connector is configured to hold an end of an optical fiber and for positive mechanical and electrical engagement with an engagement portion of the complementary connector to maintain the end of the optical fiber registered to the complementary connector. The over-nut is coupled to and surrounds the inner connector. The over-nut has a proximal end, a distal end, and a central portion separating the distal and proximal ends. The electrical assembly is disposed at the over-nut proximal end. The electrical assembly includes a first electrical contact, a second electrical contact, and one or more electrical components electrically coupled between the first and second contacts. The first electrical contact is electrically connected to the inner connector. The second electrical contact is configured for electrical engagement with a contact portion of the complementary connector. The one or more electrical components contribute to providing a defined electrical characteristic between the engagement and contact portions of the complementary connector. The RFID tag is supported by the over-nut distal end. The over-nut central portion separates the RFID tag from the electrical assembly to prevent the electrical assembly from substantially interfering with communication between the RFID tag and the radiation source assembly. In many embodiments, the electrical characteristic is resistance.

In many embodiments, the inner connector includes an existing fiber-optic connector. For example, the inner connector can include an SMA-style fiber-optic connector.

The over-nut and the electrical assembly can include particular suitable features. For example, the first contact can include a conductive cylindrical shell coaxial to and interfacing with the inner connector. The second contact can include an annular disk coaxial to and separated from the inner connector. The over-nut can have an annular recess at the over-nut proximal end; the electrical assembly can be at least partially disposed in the annular recess. The electrical assembly can have a substantially cylindrical shape having a suitably small length to outer diameter ratio (e.g., less than 0.20, less than 0.16, less than 0.12). The electrical assembly can include a non-conducting body that supports the first electrical contact, the second electrical contact, and the one or more electrical components. The over-nut can have a recess at the distal end; the RFID tag can be disposed within the distal end recess.

In another aspect, an identification assembly is provided for use with a connector configured to connect an optical fiber to a radiation source assembly having a complementary connector. The connector is configured to hold an end of the optical fiber and for positive mechanical and electrical engagement with an engagement portion of the complementary connector to maintain the end of the optical fiber registered to the complementary connector. The identification assembly includes a non-conducting over-nut, an electrical assembly, and a RFID tag. The over-nut is configured to couple to and surround the connector. The over-nut has a proximal end, a distal end, and a central portion separating the distal end and the proximal end. The electrical assembly is disposed at the over-nut proximal end. The electrical assembly includes a first electrical contact, a second electrical contact, and one or more electrical components electrically coupled between the first and second contacts. The first electrical contact is configured to electrically connect to the connector. The second electrical contact is configured for electrical engagement with a contact portion of the complementary connector. The one or more electrical components contribute to providing a defined electrical characteristic between the engagement and contact portions of the complementary connector. The RFID tag is supported by the over-nut distal end. The over-nut central portion separates the RFID tag from the electrical assembly to prevent the electrical assembly from substantially interfering with communication between the RFID tag and the radiation source assembly. In many embodiments, the electrical characteristic is resistance.

In many embodiments, the identification assembly is for use with an existing fiber-optic connector. For example, the fiber-optic connector can include an SMA-style male connector.

In the identification assembly, the over-nut and the electrical assembly can include particular suitable features. For example, the first contact can include a conductive cylindrical shell coaxial to and interfacing with the connector. The second contact can include an annular disk separated from the first contact. The over-nut can have an annular recess at the over-nut proximal end; the electrical assembly can be at least partially disposed in the annular recess. The electrical assembly can have a substantially cylindrical shape having a suitably small length to outer diameter ratio (e.g., less than 0.20, less than 0.16, less than 0.12). The electrical assembly can include a non-conducting body that supports the first electrical contact, the second electrical contact, and the one or more electrical components. The over-nut can have a recess at the distal end; the RFID tag can be disposed within the distal end recess.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Electrical-Characteristic Based Identification

Figure 1:
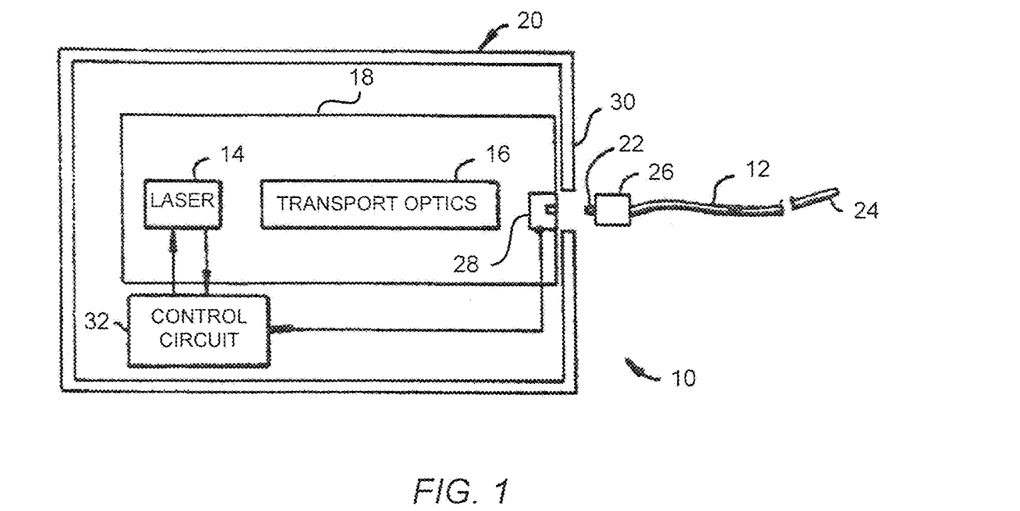
FIG. 1 is a simplified schematic diagram illustrating a radiation source assembly that employs electrical-characteristic based identification of a detachable delivery conduit.

Referring now to the drawings, in which like reference numerals represent like parts throughout the several views, FIG. 1 shows a radiation source assembly 10 that employs electrical-characteristic based identification of a detachable delivery conduit 12. The delivery conduit 12 can be, for example, an optical fiber used to deliver radiation generated by a laser 14 to a patient tissue. The laser 14 and associated transport optics 16 are mounted to a frame 18, which is mounted within a cabinet 20. The delivery conduit 12 has a proximal end 22 and a distal end 24. The proximal end 22 is mounted within a connector assembly 26 that mates with a complementary connector assembly 28 of the radiation source assembly 10. The connector assembly 28 is mounted to the frame 18 inside the cabinet 20 and is accessible through an aperture in a wall 30 of the cabinet 20. The radiation source assembly 10 can be adjustable to register the connector assembly 28 relative to the laser 14 and the transport optics 16. Radiation generated by the laser 14 is received into the proximal end 22 of the delivery conduit 12 and output from the distal end 24 as an output beam.

Located in the cabinet 20 is a control circuit 32 for operating the laser 14. As will be described below, an electrical assembly that forms part of the connector assembly 26 is electrically coupled with the control circuit 32 via the connector assembly 28. The electrical assembly includes one or more electrical components that contribute to providing a defined electrical characteristic. In addition to controlling the operation of the laser 14, the control circuit 32 evaluates the electrical characteristic provided by the electrical assembly to identify the delivery conduit 12.

Figure 2:
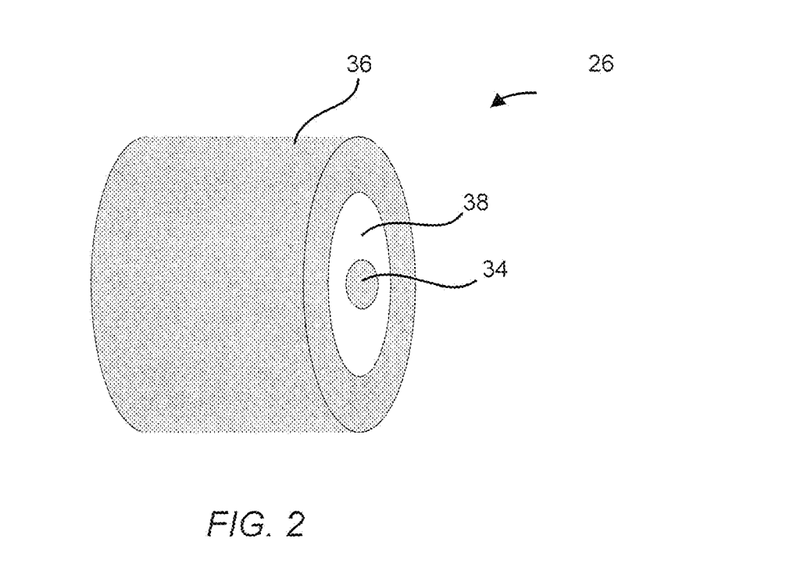
FIG. 2 is a simplified perspective view of a connector assembly identifiable by a radiation source that employs electrical-characteristic based identification.

FIG. 2 is a simplified perspective depiction of components of the connector assembly 26. The connector assembly 26 includes a conductive inner connector 34, a conductive outer shell 36, and an insulator 38 separating the conductive inner connector 34 and the conductive outer shell 36. The inner connector 34 is configured to hold the proximal end 22 of the delivery conduit 12 and for positive mechanical and electrical engagement with an engagement portion of the connector assembly 28 to maintain the proximal end 22 registered to the connector assembly 28. The electrical assembly portion of the connector assembly 26 is coupled between the inner connector 34 and the outer shell 36. The electrical assembly can be disposed within and/or supported by the insulator 38. When the connector assembly 26 is coupled to the connector assembly 28, the inner connector 34 is electrically coupled to the control circuit 32 and the conductive outer shell 36 is coupled with a ground potential, to which the control circuit 32 is also coupled, thereby coupling the control circuit 32 to a circuit that includes the electrical assembly of the connector assembly 26.

Figure 3:
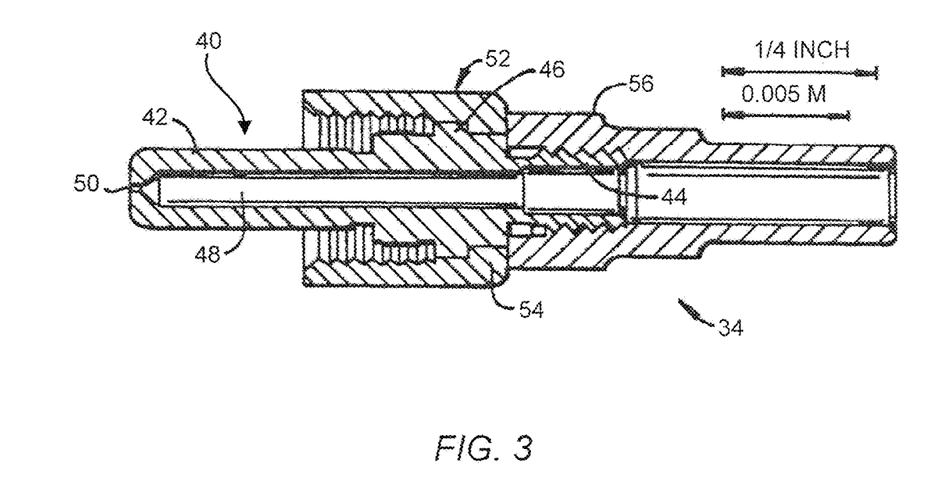
FIG. 3 is a cross-sectional view of a prior art SMA-style fiber-optic connector.

FIG. 3 is a cross-sectional view of a typical prior art SMA-style fiber-optic connector 34, such as a DSC Series connector available from Augat Communications Group, Seattle Wash. The connector includes a ferrule 40 designed to hold the end of an optical fiber. The ferrule 40 has a cylindrical portion 42 at a first end, an externally-threaded portion 44 at a second end, and an intermediate flange 46. The cylindrical portion 42 is fabricated with a precise outer diameter (0.1248 inches or 0.003170 meters in a specific embodiment). The ferrule 40 has an inner bore 48 sized to accommodate a sheathed optical fiber. At the first end of the ferrule 40 is a fine bore 50 of a diameter that can be slightly bigger than the outer diameter of the actual optical fiber. A conductive cable nut 52 is rotationally mounted to the ferrule 40. The cable nut 52 has an inwardly extending flange 54, which is captured between the intermediate flange 46 and a back post 56. The back post 56 is threaded onto the ferrule 40.

Figure 4:
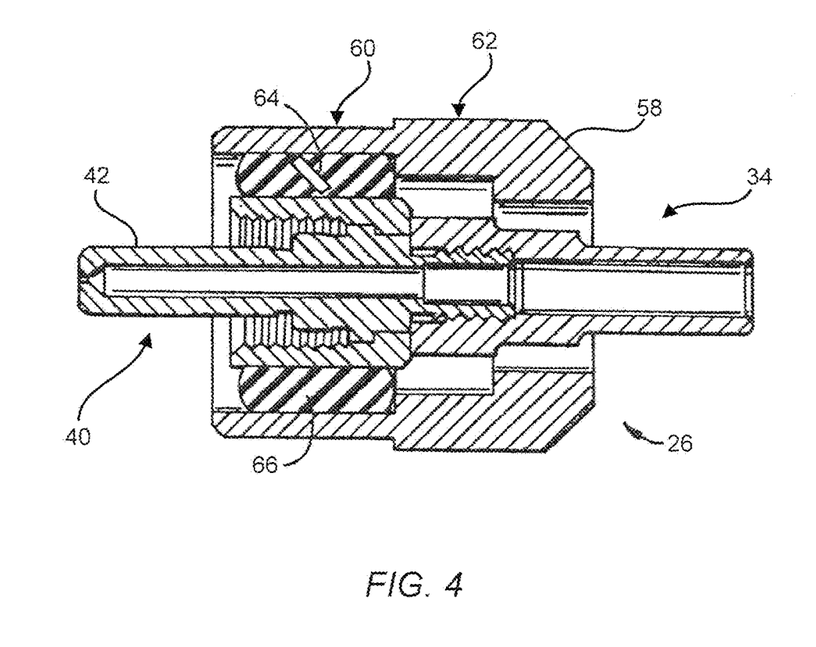
FIG. 4 is a cross-sectional view of a connector assembly that includes a resistor for identification of an associated delivery conduit.

FIG. 4 is a partial sectioned view of the connector assembly 26. In addition to the SMA-style connector 34 described above, the connector assembly 26 includes a conductive outer shell 58 that surrounds the cable nut 52 and portions of the ferrule 40 and the back post 56. The ferrule's cylindrical portion 42 extends beyond the outer shell 58. The outer shell 58 has a smooth surface 60 over a first portion of its axial extent and a knurled surface 62 over a second portion of its axial extent.

A resistor 64 is electrically connected between the cable nut 52 and the outer shell 58 in an annular region there between. An insulating material 66 at least partially fills the annular region and serves to bond the outer shell 58 to the cable nut 52 so that the outer shell 58, the resistor 64, and the cable nut 52 rotate as a unit relative to the ferrule 40.

Figure 5A:
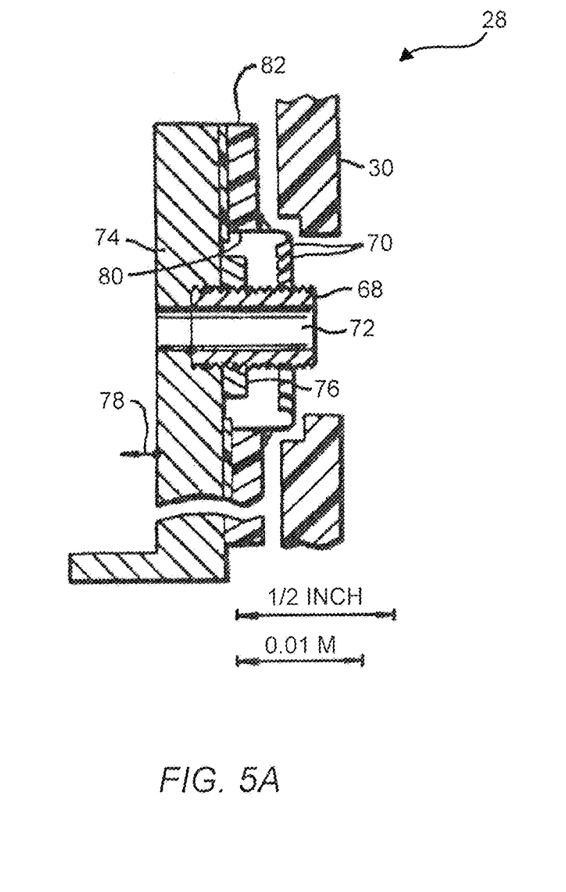
FIGS. 5A and 5B are cross-section and elevation views showing a female connector and a contact assembly of a radiation source that employs electrical-characteristic based identification of an attached delivery conduit.
Figure 5B:
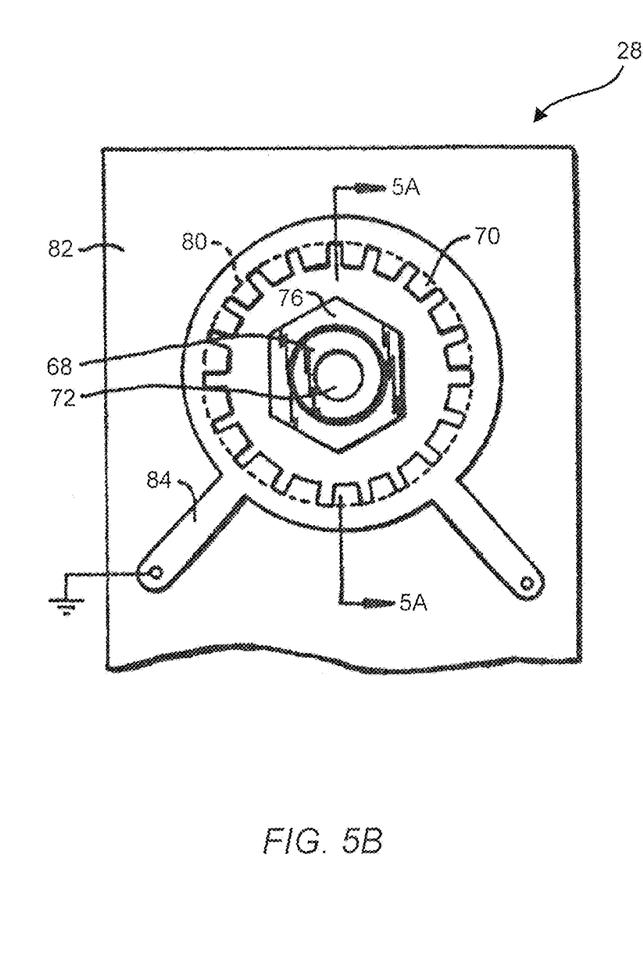

FIGS. 5A and 5B show a cross section and an elevation view of the connector assembly 28. FIG. 5B shows the connector assembly 28 with the cabinet wall 30 not shown. The connector assembly 28 includes a threaded bushing 68 and a ring of contacts 70. The bushing 68 has external threads that interface with the threads of the cable nut 52. The bushing 68 has a bore 72 configured to provide a precise slip fit with the cylindrical portion 42 of the ferrule 40. The bushing 68 is threaded into a hole in a bracket 74, which is mounted to the frame 18, and is locked in place by a nut 76. The bracket 74 and the bushing 68 define a sense node 78 electrically coupled to the control circuit 32.

The contacts 70 can be made from a springy metal, such as phosphor bronze. Each contact 70 is in the form of a generally u-shaped metal tab and the contacts 70 are integrally formed on a carrier strip 80. The carrier strip 80 has a cylindrical configuration and is inserted in a circular aperture in a circuit board 82. The carrier strip 80 is soldered into the circuit board 82 so that the contacts 70 intrude into the aperture. The contacts 70 are disposed around a circle of a diameter that offers some resistance to insertion of the smooth surfaced portion 60 of the conductive outer shell 58. The circuit board 82 includes conductive portions 84 that connect the contacts 70 to ground potential.

The connector assembly 26 interfaces with the connector assembly 28 when the ferrule 40 is inserted into the bore 72 and the cable nut 52 is threaded onto the outer threaded surface of the bushing 68. The outer shell surface portion 60 is forced into the ring of contacts 70 and makes electrical contact therewith. Alternatively, the contacts 70 can be disposed to interface with the proximal end of the outer shell 58. The threaded engagement between the cable nut 52 and the bushing 68 provides electrical contact between one side of the resistor 64 and the bracket 74 (sense node 78) and the contact between the outer shell 58 and the contacts 70 connect the other side of the resistor 64 to ground.

The control circuit 32 is configured to identify the attached delivery conduit 12 based on the amount of resistance provided by the resistor 64. The control circuit 32 is electrically coupled with the resistor 64 via the electrical connection between the control circuit 32 and the sense node 78. Details of a suitable approach for identifying an attached delivery conduit using electrical-characteristic based identification are disclosed in U.S. Pat. No. 5,085,492, entitled "Optical Fiber Wwith Electrical Encoding", the entire disclosure of which is hereby incorporated herein by reference.

RFID-Based Identification

Figure 6:
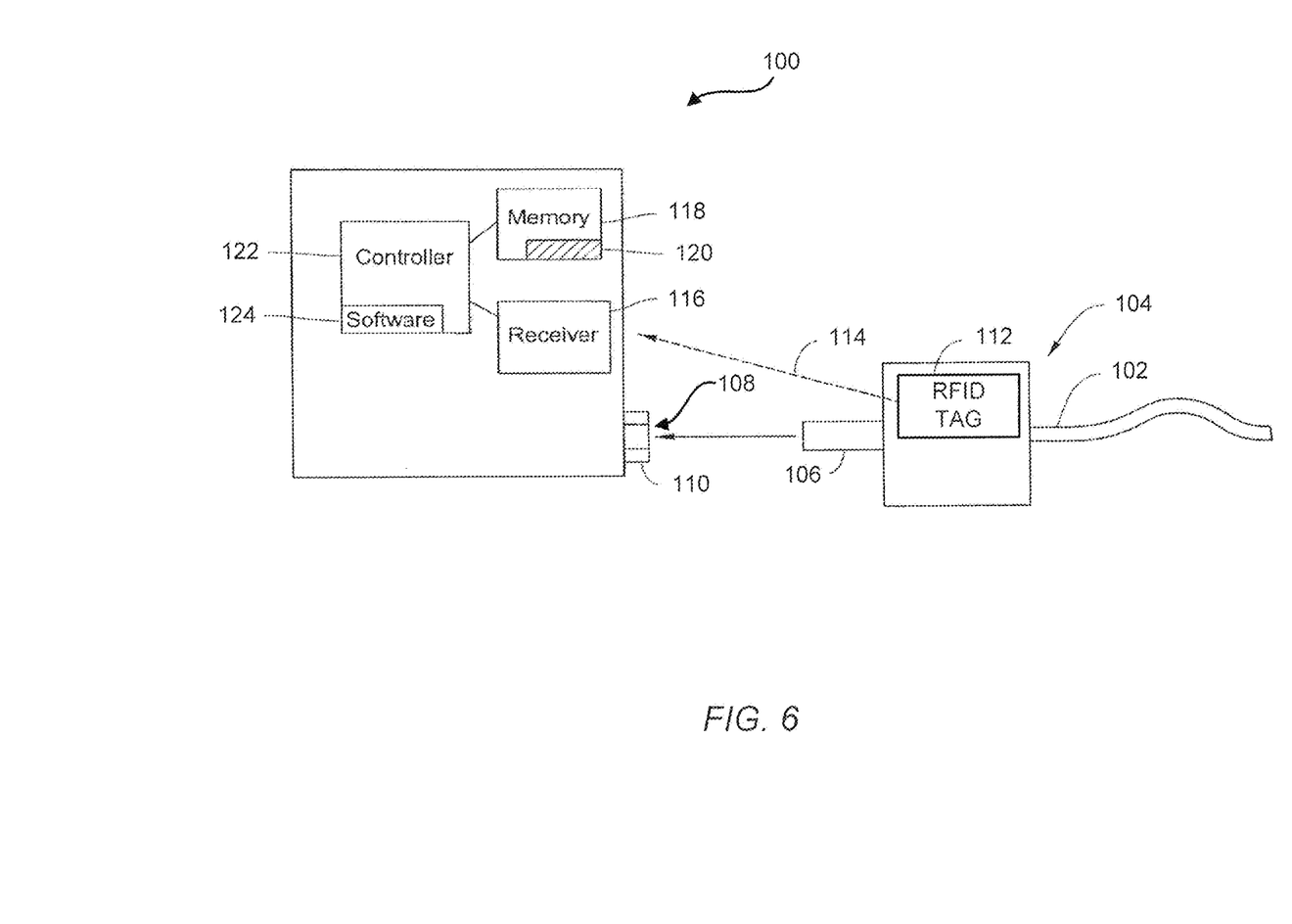
FIG. 6 is a simplified schematic diagram illustrating a radiation source assembly that employs RFID-based identification of an attached delivery conduit.

FIG. 6 illustrates a radiation source assembly 100 that employs RFID-based identification of an attached delivery conduit 102. The delivery conduit 102 can be, for example, an optical fiber. A connector assembly 104 is used to couple the delivery conduit 102 to the radiation source assembly 100. A proximal end of the delivery conduit is held within a male cylindrical portion 106 of the connector assembly. The cylindrical portion 106 is received within a corresponding female receptacle 108 of a connector assembly 110, which is attached to the radiation source assembly 100. When the connector assembly 104 is coupled to the connector assembly 110, the proximal end of the delivery conduit 102 is held registered to the radiation source assembly 100 to receive radiation (e.g., laser light) that is output from a distal end of the delivery conduit 102 as an output beam.

An RFID tag assembly 112 is integrated into the connector assembly 104. The RFID tag assembly 112 transmits data 114 to a receiver 116 of the radiation source assembly 100. The data 114 can be used to verify that the attached delivery conduit 102 is an authorized component and/or to simply identify the attached delivery conduit 102. For example, each particular delivery conduit 102 and/or each particular type of delivery conduit 102 can be programmed with particular data 114. The radiation source assembly 100 includes a memory 118 that stores criteria 120, such as a set of authorized codes or data, or an algorithm, formula, and/or other pre-defined criteria.

The radiation source assembly 100 includes a controller 122, such as a processor or microcontroller, that is programmed with software 124 and/or hardware. The controller 122 processes the data 114 received from the RFID tag assembly 112 and the criteria 120 stored in memory 118 to determine whether the attached delivery conduit 102 should be accepted or denied and whether the radiation source assembly 100 should be enabled or disabled. Details of a suitable approach for identifying an attached delivery conduit using RFID-based identification are disclosed in U.S. Pat. No. 7,934,648, entitled "System and Method for Identifying and Controlling Ophthalmic Surgical Devices and Components," the entire disclosure of which is hereby incorporated herein by reference.

In many embodiments, the radiation source assembly 100 is an ophthalmic laser console and the delivery conduit 102 is an optical probe. Light generated by the ophthalmic laser console is provided to the optical probe, which is manipulated by a surgeon so that the light is delivered by the delivery conduit 102 to a surgical site.

Figure 7:
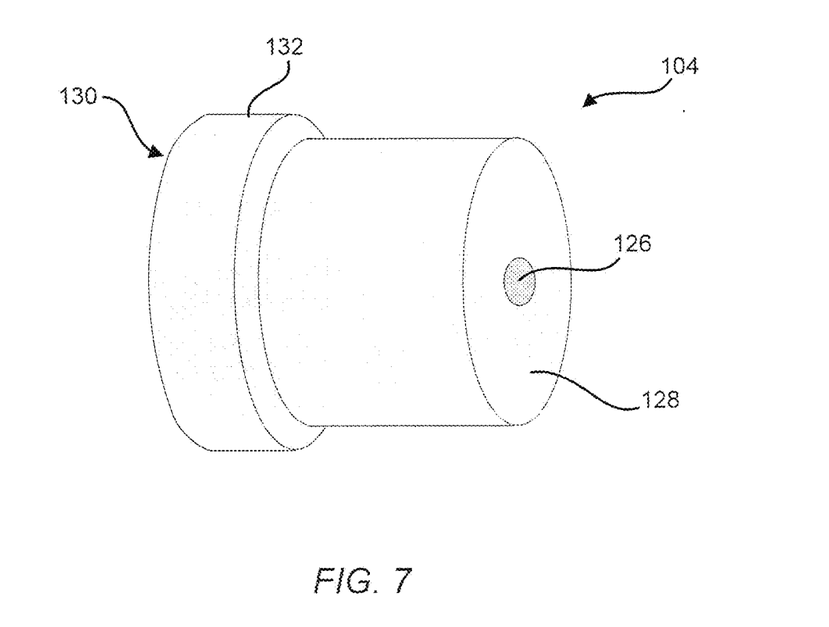
FIG. 7 is a simplified perspective view of a connector assembly that includes a RFID tag for identification by a radiation source that employs RFID-based identification of an associated delivery conduit.

FIG. 7 is a simplified perspective depiction of components of the connector assembly 104. The connector assembly 104 includes a conductive inner connector 126, a non-conductive over-nut 128, and an RFID tag assembly 130 disposed within a distal flange 132 of the over-nut 128. Disposing the RFID tag assembly 130 within the distal flange 132 of the non-conducting over-nut 128 locates the RFID tag assembly 130 so as to avoid disrupting communication between the RFID tag assembly 130 and the receiver 116. The material used for the over-nut 128 can be selected to not interfere with communication between the RFID tag assembly 130 and the receiver 116.

Hybrid Identification

Figure 8:
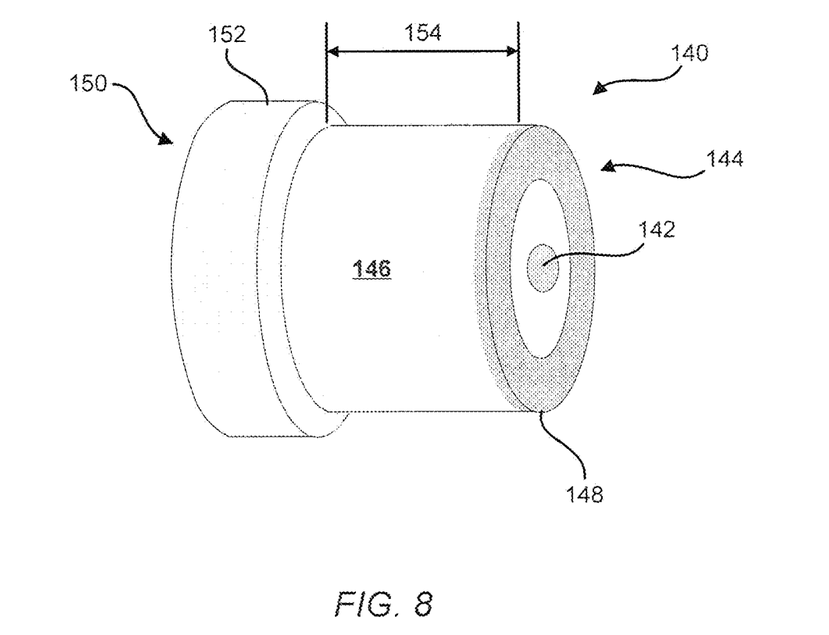
FIG. 8 is a simplified perspective view of a connector assembly that is identifiable by a radiation source that employs electrical-characteristic based identification and by a radiation source that employs RFID-based identification, in accordance with many embodiments.

FIG. 8 is a simplified perspective view of a connector assembly 140 that can be identified via electrical-characteristic based identification (e.g., by radiation source assembly 10) and by RFID-based identification (e.g., by radiation source assembly 100), in accordance with many embodiments. The connector assembly 140 includes a conductive inner connector 142 and a surrounding identification assembly 144. The inner connector 142 can be any suitable delivery conduit connector, for example, an SMA-style fiber optic connector such as the inner connector 34 described herein.

The identification assembly 144 includes a non-conductive over-nut 146, an electrical assembly 148 disposed at the proximal end of the over-nut 146, and an RFID tag assembly 150 disposed within a distal flange 152 of the over-nut 146. The material for the over-nut 146 is selected to not interfere with communication between the RFID tag assembly 150 and a receiver in the radiation source assembly (e.g., receiver 116 of radiation source assembly 100). The electrical assembly 148 includes two separate electrical contacts and one or more electrical components (e.g., one or more resistors) electrically connected between the two contacts. One of the contacts interfaces with the inner connector 142 and the other contact is configured to interface with a corresponding contact of the radiation source assembly (e.g., with contacts 70 of the radiation source assembly 10) when the associated delivery conduit is attached to the radiation source assembly. A central portion 154 of the over-nut 146 separates the electrical assembly 148 from the RFID tag assembly 150, thereby reducing interference with the RFID communication that may be caused by the electrical assembly 148 without such separation.

Figure 9:
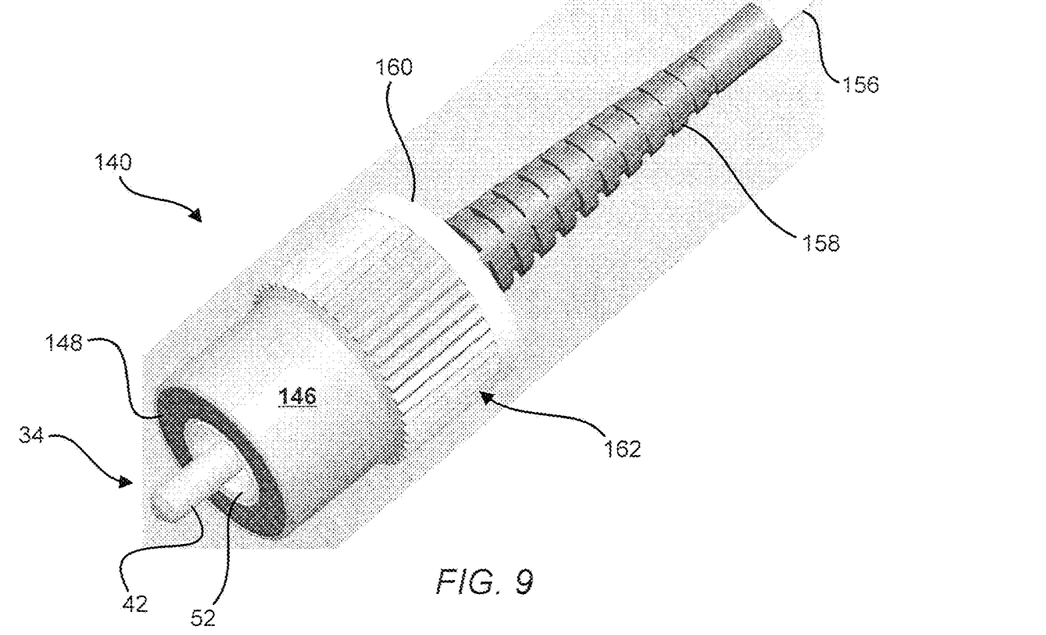
FIG. 9 is a perspective view of a connector assembly that is identifiable by a radiation source that employs electrical-characteristic based identification and by a radiation source that employs RFID-based identification, in accordance with many embodiments.

FIG. 9 is a perspective view of a delivery conduit 156 coupled with an embodiment of the connector assembly 140. A proximal end of the delivery conduit 156 is held within the cylindrical portion 42 of the inner connector 34. A flexible reinforcement member 158 surrounds the delivery conduit 156 and is coupled with the connector assembly 140 via an end cap 160. The flexible reinforcement member 158 limits deflections of the delivery conduit 156 relative to the connector assembly 140, thereby helping to protect the delivery conduit 156 from deflection induced damage. The electrical assembly 148 is disposed at least partially within an annular recess at the proximal end of the connector assembly 140, thereby positioning and orienting a contact of the electrical assembly 148 to interface with a corresponding contact of the radiation source assembly, if so equipped. The RFID tag assembly 150 is disposed within a distal annular recess of the non-conducting over-nut 146 proximal of the end cap 160. The material for the end cap 160 can also be selected to not interfere with communication between the RFID tag assembly 130 and the receiver 116. The over-nut 146 includes an area having longitudinally-oriented ridges 162, which provide a gripping surface for rotating the connector assembly 140 to couple the delivery conduit 156 to a radiation source assembly.

Figure 10:
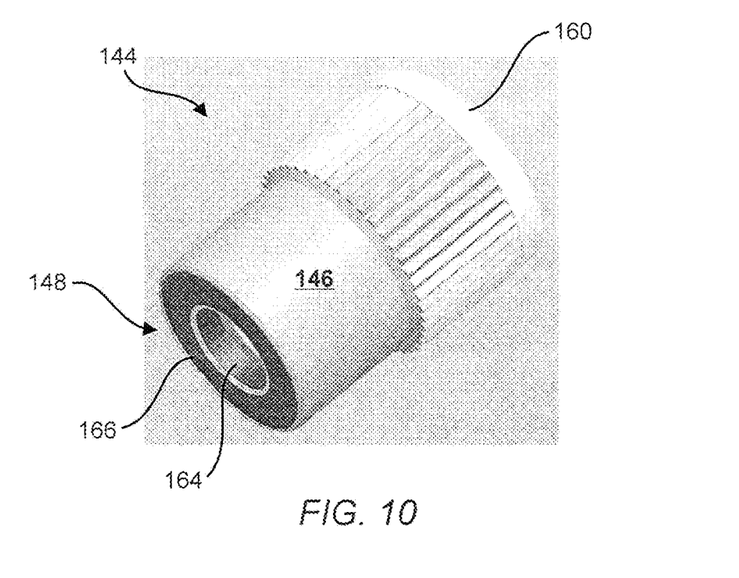
FIG. 10 is a perspective view of an identification assembly of the connector assembly of FIG. 9.

FIG. 10 is a perspective view of the identification assembly 144 and the end cap 160 of the connector assembly 140. The electrical assembly 148 has an annular disk shape and is disposed within a proximal annular recess of the over-nut 146. A first electrical contact 164 of the electrical assembly 148 is disposed on an inner cylindrical surface of the electrical assembly 148 to interface with the outer cylindrical surface of the cable nut 52 of the inner connector 34. A second electrical contact 166 of the electrical assembly 148 is disposed on a proximal annular disk surface of the electrical assembly 148 to interface with a corresponding contact of the radiation assembly, if so equipped. The identification assembly 144 is configured to couple with the inner connector 34 such that the identification assembly and the cable nut 52 can be rotated as an integral unit about the ferrule 40. Any suitable approach for coupling the identification assembly 144 to the inner connector 34 can be used, such as an interference fit and/or bonding.

Figures 11A, 11B:
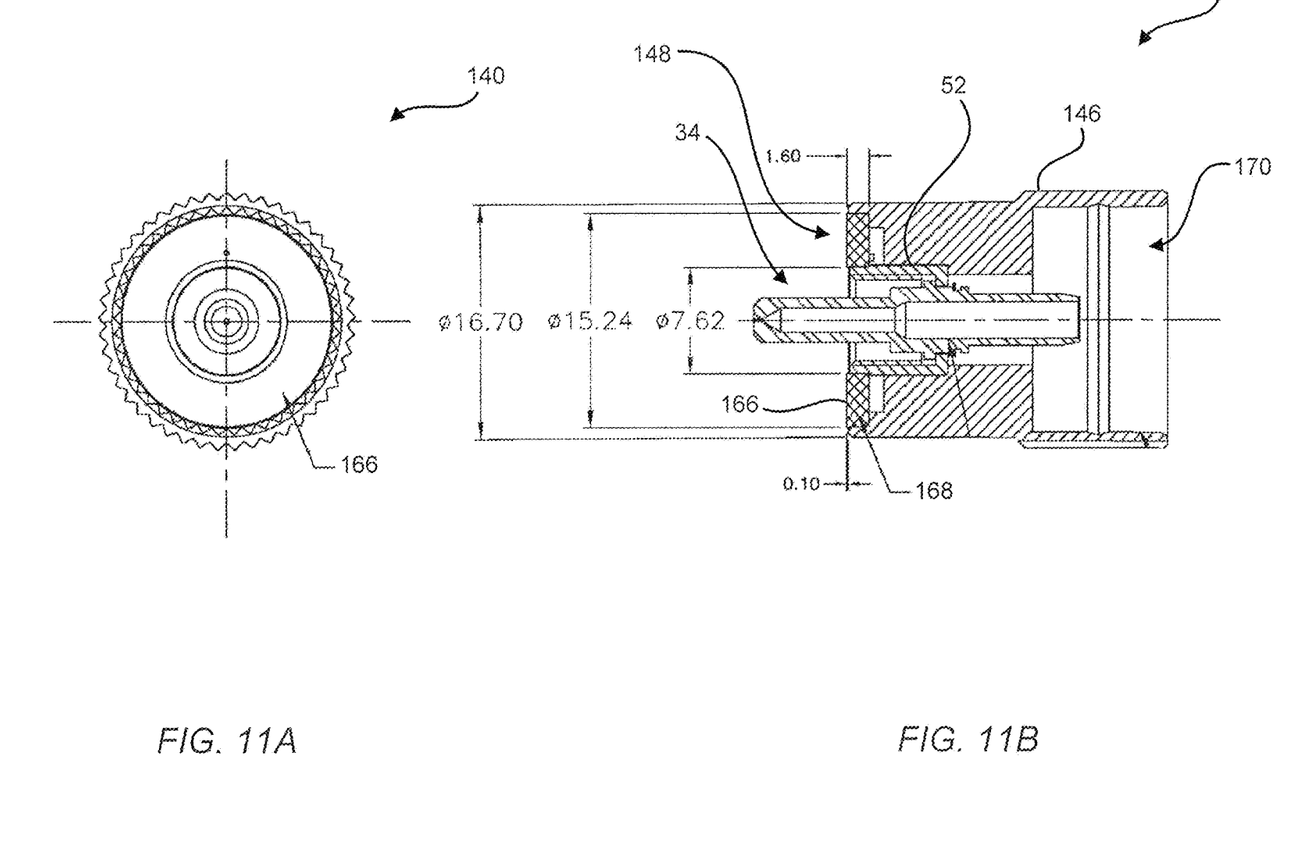
FIG. 11A is an end view of the connector assembly of FIG. 9.
FIG. 11B is a cross-sectional view illustrating components of the connector assembly of FIG. 9.

FIG. 11A shows an end view of components of the connector assembly 140. FIG. 11B shows a cross-sectional view of components of the connector assembly 140. The electrical assembly 148 has an annular disk shape. The electrical assembly 148 surrounds and interfaces with an outer cylindrical surface of the cable nut 52 of the inner connector 34. In the embodiment shown, the electrical assembly 148 has a length of 1.60 mm, an outer diameter of 15.24 mm, and an inner diameter of 7.62 mm. The electrical assembly 148 is disposed primarily within a recess in the proximal end of the non-conducting over-nut 146, but protrudes from the proximal recess by 0.10 mm. The first electrical contact 164 interfaces with the cable nut 52 and the second electrical contact 166 is positioned and oriented to interface with a corresponding contact of a radiation source assembly (e.g., such as contacts 70 of the radiation source 10), if so equipped. The electrical assembly 148 can include a body section 168 made from an insulating material. In many embodiments, the one or more electrical components of the electrical assembly 148 (e.g., one or more resistors) are disposed within and are supported by the body section 168. The over-nut includes a distal recess 170 in which the RFID tag assembly 150 is disposed.

Figure 12A:
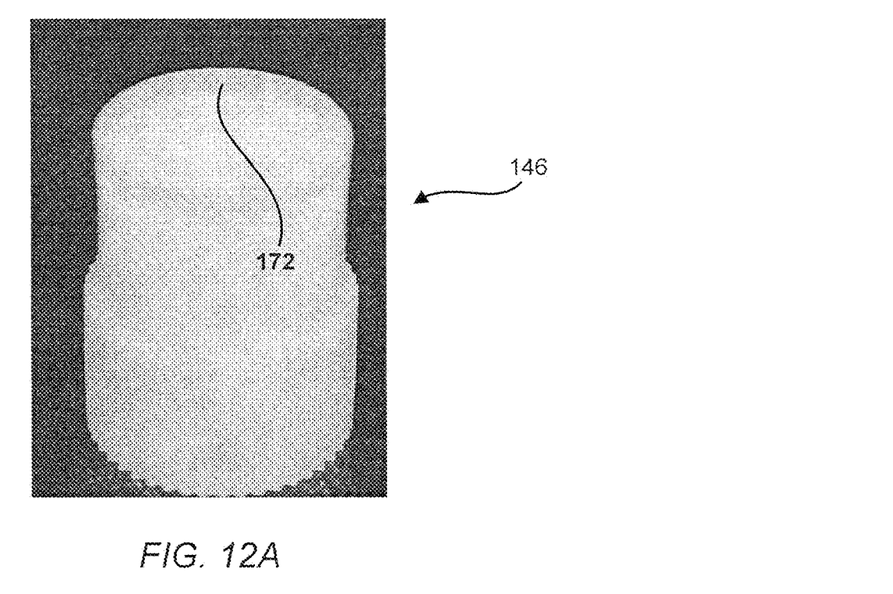
FIGS. 12A and 12B are perspective views illustrating a non-conducting over-nut of the connector assembly of FIG. 9.
Figure 12B:
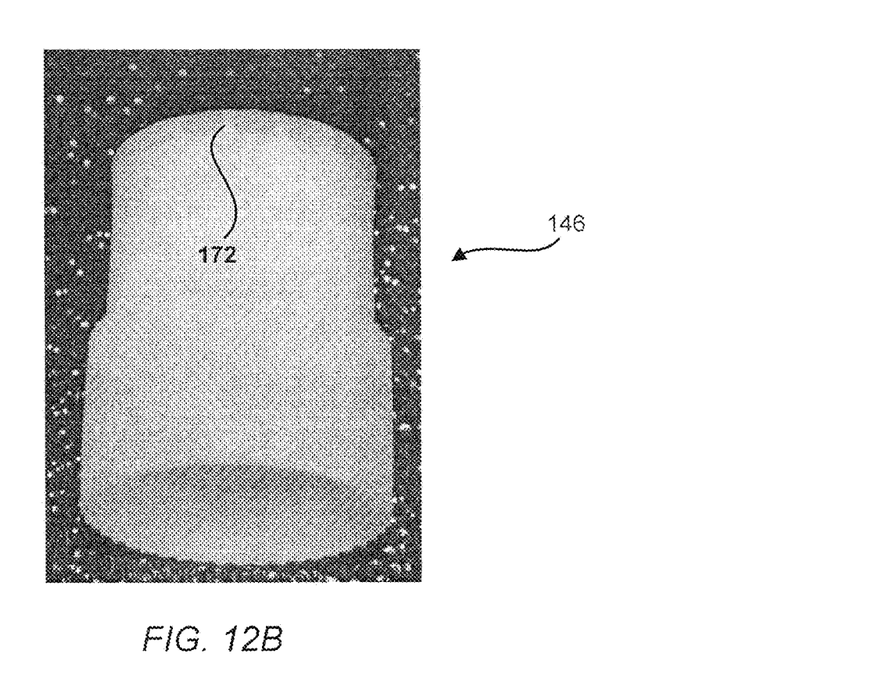

FIGS. 12A and 12B are perspective views illustrating the non-conducting over-nut 146. In the proximal recess of the over-nut 146, intermittent ribs 172 are configured to interface with an exterior cylindrical surface of the electrical assembly 148.

Figure 13A:
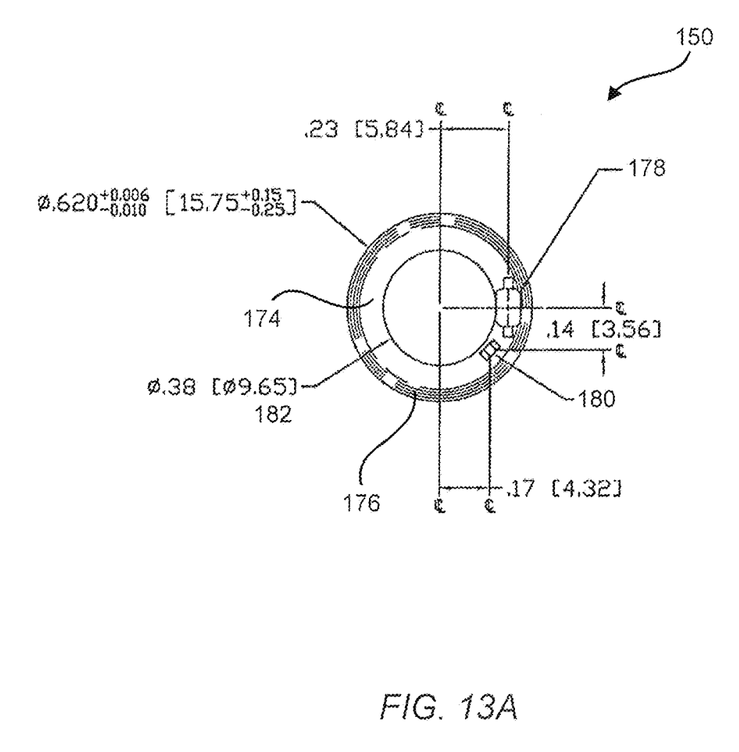
FIGS. 13A and 13B are end and side views illustrating an RFID tag assembly of the connector assembly of FIG. 9.
Figure 13B:
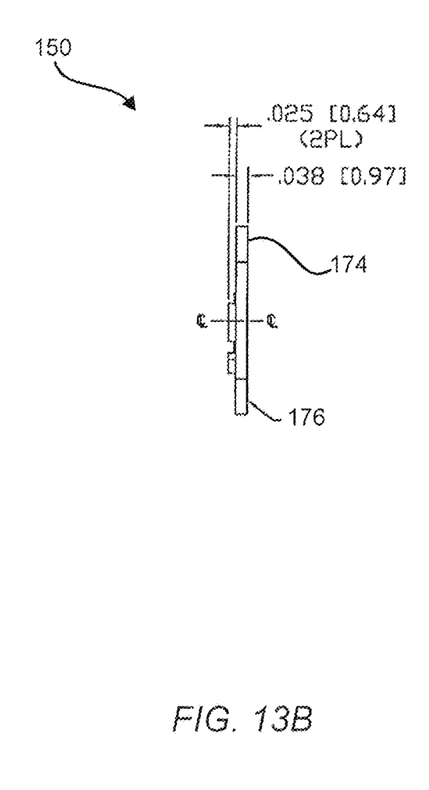

FIGS. 13A and 13B and end and side views illustrating the RFID tag assembly 150 of the connector assembly 140. The RFID tag assembly 150 includes a tag circuit board 174, and an antenna circuit 176, an RFID chip 178, and a capacitor 180 mounted to the tag circuit board 174. The tag circuit board 174 includes a central aperture 182 through which the delivery conduit 156 is routed.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A fiber optic connector for use with a radiation source assembly having a complementary connector, the fiber optic connector comprising:
    an inner connector configured to hold an end of an optical fiber and for positive mechanical and electrical engagement with an engagement portion of the complementary connector to maintain the end of the optical fiber registered to the complementary connector;
    a non-conducting over-nut coupled to and surrounding the inner connector; the over-nut having a proximal end, a distal end, and a central portion separating the distal and proximal ends;
    an electrical assembly disposed at the over-nut proximal end, the electrical assembly including
        a first electrical contact electrically connected to the inner connector,
        a second electrical contact configured for electrical engagement with a contact portion of the complementary connector, and
        one or more electrical components electrically coupled between the first and second contacts and contributing to the provision of a defined electrical characteristic between the engagement and contact portions of the complementary connector; and
    a radio frequency identification (RFID) tag supported by the over-nut distal end, the over-nut central portion separating the RFID tag from the electrical assembly to prevent the electrical assembly from substantially interfering with communication between the RFID tag and the radiation source assembly.

2. The fiber-optic connector of claim 1, wherein the electrical characteristic is resistance.

3. The fiber-optic connector of claim 1, wherein the inner connector comprises an SMA-style fiber-optic connector.

4. The fiber-optic connector of claim 1, wherein:
    the first contact comprises a conductive cylindrical shell coaxial to and interfacing with the inner connector; and
    the second contact comprises an annular disk coaxial to and separated from the inner connector.

5. The fiber-optic connector of claim 4, wherein:
    the over-nut has a annular recess at the over-nut proximal end; and
    the electrical assembly is at least partially disposed in the annular recess.

6. The fiber-optic connector of claim 4, wherein the electrical assembly has a substantially cylindrical shape having a length to outer diameter ratio of less than 0.20.

7. The fiber-optic connector of claim 6, wherein the electrical assembly has a substantially cylindrical shape having a length to outer diameter ratio of less than 0.16.

8. The fiber-optic connector of claim 7, wherein the electrical assembly has a substantially cylindrical shape having a length to outer diameter ratio of less than 0.12.

9. The fiber-optic connector of claim 4, wherein the electrical assembly comprises a non-conducting body that supports the first electrical contact, the second electrical contact, and the one or more electrical components.

10. The fiber-optic connector of claim 1, wherein:
    the over-nut has a recess at the distal end; and
    the RFID tag is disposed within the distal end recess.

11. An identification assembly for use with a connector configured to connect an optical fiber to a radiation source assembly having a complementary connector, the connector being configured to hold an end of the optical fiber and for positive mechanical and electrical engagement with an engagement portion of the complementary connector to maintain the end of the optical fiber registered to the complementary connector, the identification assembly comprising:
    a non-conducting over-nut configured to couple to and surround the connector; the over-nut having a proximal end, a distal end, and a central portion separating the distal end and the proximal end;
    an electrical assembly disposed at the over-nut proximal end, the electrical assembly including
        a first electrical contact configured to electrically connect to the connector,
        a second electrical contact configured for electrical engagement with a contact portion of the complementary connector, and one or more electrical components electrically coupled between the first and second contacts and contributing to the provision of a defined electrical characteristic between the engagement and contact portions of the complementary connector; and a radio frequency identification (RFID) tag supported by the over-nut distal end, the over-nut central portion separating the RFID tag from the electrical assembly to prevent the electrical assembly from substantially interfering with communication between the RFID tag and the radiation source assembly.

12. The identification assembly of claim 11, wherein the electrical characteristic is resistance.

13. The identification assembly of claim 11, wherein the fiber-optic connector comprises an SMA-style fiber-optic connector.

14. The identification assembly of claim 11, wherein:
the first contact comprises a conductive cylindrical shell coaxial to and interfacing with the connector; and
the second contact comprises an annular disk separated from the first contact.

15. The identification assembly of claim 14, wherein:
the over-nut has a annular recess at the over-nut proximal end; and
the electrical assembly is at least partially disposed in the annular recess.

16. The identification assembly of claim 14, wherein the electrical assembly has a substantially cylindrical shape having a length to outer diameter ratio of less than 0.20.

17. The identification assembly of claim 16, wherein the electrical assembly has a substantially cylindrical shape having a length to outer diameter ratio of less than 0.16.

18. The identification assembly of claim 17, wherein the electrical assembly has a substantially cylindrical shape having a length to outer diameter ratio of less than 0.12.

19. The identification assembly of claim 14, wherein the electrical assembly comprises a non-conducting body that supports the first electrical contact, the second electrical contact, and the one or more electrical components.

20. The identification assembly of claim 11, wherein:
the over-nut has a recess at the distal end; and
the RFID tag is disposed within the distal end recess.

* * * * *